United States Patent [19]
Wilson et al.

[11] 3,870,127
[45] Mar. 11, 1975

[54] VARIABLE-LEVERAGE BRAKES FOR BICYCLES AND THE LIKE

[76] Inventors: David G. Wilson, 42 Winston St., Cambridge, Mass. 02138; Brian D. Hanson, 5101 Park Rd. Apt. 106, Charlotte, N.C. 28209; John M. Malarkey, 328 Marlborough St., Boston, Mass. 02215

[22] Filed: June 14, 1972

[21] Appl. No.: 262,457

[52] U.S. Cl. .............................................. 188/24
[51] Int. Cl. .............................................. B62l 1/00
[58] Field of Search .......... 188/24, 344, 72.6, 72.9, 188/26

[56] References Cited
UNITED STATES PATENTS

| | | | |
|---|---|---|---|
| 1,786,633 | 12/1930 | Rushmore | 188/347 |
| 2,699,228 | 1/1955 | Mennesson | 188/24 |
| 2,781,106 | 2/1957 | Lucien | 188/72.6 |
| 3,680,663 | 8/1972 | Kine | 188/24 |

*Primary Examiner*—Trygve M. Blix
*Assistant Examiner*—Sherman D. Basinger

[57] ABSTRACT

The invention applies principally to hand-operated bicycle brakes of the type which bring brake blocks mounted on calipers to bear on the wheel rims, although the invention may be applied to other types of brakes such as disk or hub brakes and to other vehicles and machines. A varying mechanical advantage, the degree of which being set by sensing the application force, is given between the application lever and the brake blocks. Such an arrangement allows for a large braking force to be applied compared with mechanisms having constant mechanical advantage, and it can compensate for wear without the need for periodic adjustments. The larger-than-normal braking force allows the use of brake-block materials which, while having a lower dry coefficient of friction than the conventional rubber composition brake blocks, have relatively improved wet-weather performance.

3 Claims, 3 Drawing Figures

PATENTED MAR 11 1975

VARIABLE-LEVERAGE BRAKES FOR BICYCLES AND THE LIKE

This invention principally concerns bicycle brakes which operate on standard wheel rims, front or rear, and provide improved wet-weather braking, automatic wear compensation, and reduced cable and linkage stresses with consequent greatly improved reliability.

Presently available bicycle brakes are manufactured in several types. The most commonly used in the United States has been the rear-wheel 'coaster' or back-pedalling brake, which is effective on the back wheel only in wet and dry conditions. However, because the weight of a vehicle and rider is transferred predominantly to the front wheel in emergency stops, it is important to have adequate braking means on the front wheel.

Internal-expanding drum brakes have also been made for bicycles and have been used on both wheels. Their effectiveness has been generally judged to be poor even in dry weather. In addition, a heavy hub and spokes have to be used to transmit the braking torque at a small diameter.

Recently, disk brakes have been developed for motor cycles and lately for bicycles. On bicycles these have so far been applied only to the rear wheels. They are claimed to be a considerable advance on drum brakes, but still involve a weight penalty.

So-called lightweight bicycles use brakes in which rubber-composition blocks are squeezed on to the wheel rims by means of calipers. These brakes are effective in dry weather, but suffer a very serious drop in performance when the wheel becomes wet. The coefficient of friction has been found in tests to fall to between one-third and one-twentieth of the normal, dry, value. Riders must therefore compensate by applying a much greater braking force. In doing so, the flexible-cable system, which is almost universally used for actuation, is strained and occasionally fails at the moment when the need is greatest.

It is not feasible simply to change the leverage between the hand lever and the brake blocks because a considerable allowance must be made for wheel wobble and for brake-block wear in determining the maximum movement which the brake blocks must undergo when the hand lever is squeezed.

The present invention is designed to overcome the major disadvantages of rim brakes and thereby to make them superior to any existing form of bicycle brake for either front or rear wheel.

The essential principle of the present invention is that the connection between the hand lever and the brake block has a varying mechanical advantage. Initial movement of the hand lever moves the brake blocks at a low mechanical advantage; in other words, the brake blocks move a comparatively large distance for a small movement of the hand levers. As the brake blocks make contact with the rim, the mechanisms to be described sense the increase in reaction force and, at a predetermined level, increase the mechanical advantage gradually or in a step-wise manner so that a normal force at the hand lever is capable of giving a force at the rim much increased over that which can be delivered by normal caliper brakes.

This capability in itself gives substantial advantages. It also enables one to use brake-block materials which, while having a smaller dry coefficient of friction than have typical rubber-composition brake blocks, suffer a smaller proportional reduction in friction coefficient when wet. We have carried out tests on typical bicycle wheels with various brake-block materials, and these tests have shown that materials formulated for automobile disk brake pads experience a fall in coefficient of friction from about 0.35 when dry to 0.10 when wet. Typical rubber-composition brake blocks showed a fall from about 0.90 to 0.13 in the same conditions.

Two embodiments of this invention will now be described. The first approach is to use mechanical levers having at least two alternative fulcrum points. The second approach is to use hydraulic cylinders of at least two face areas. In both cases the transfer from low to high mechanical advantage is effected by sensing brake-block contact forces.

These embodiments of the invention will now be described in conjunction with the appended drawing in which FIG. 1 is an elevation showing the basic components of a mechanical system;

MECHANICAL-LEVER MECHANISM

Figure 1:
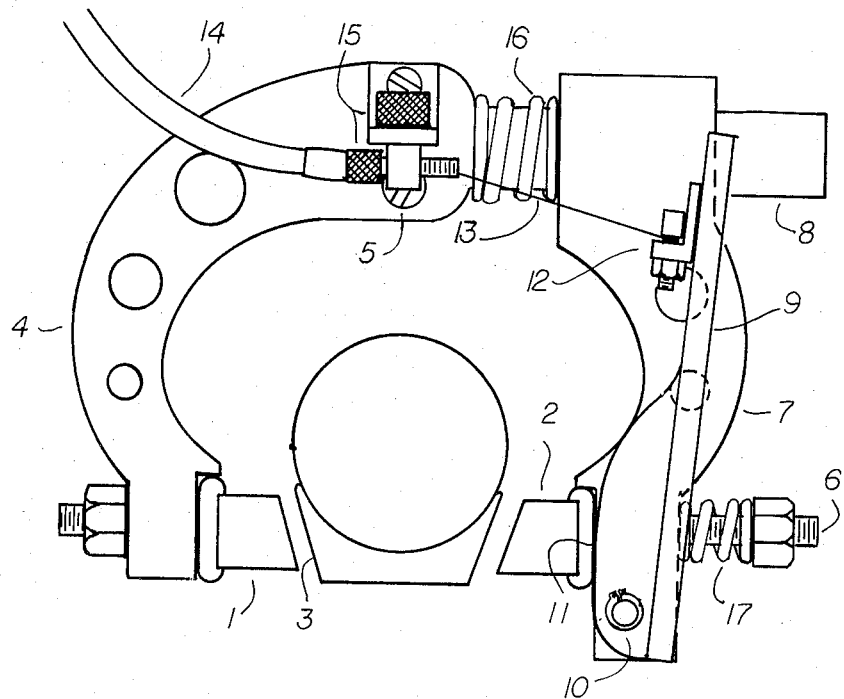

This embodiment of the invention may be understood by reference to FIG. 1. In this figure, 1 and 2 are the brake blocks which bear on the metal rim of the wheel, 3. The main caliper of the brake, 4, is pivoted to the bicycle frame through a hole, 5, and provided with a centering spring or other mechanism, not shown, of conventional type.

Brake-block 1 is rigidly fixed to the main caliper 4 while brake-block 2 is mounted on a spring-returned slider, 6, in the second caliper, 7, which is free to slide on a straight member 8 of the main caliper, of such a form that relative rotation of the second caliper is not possible. For instance, the straight member of the main caliper, 8, may be of rectangular section, as it was in the prototype, or there may be a multiplicity of circular rods, or one member circular in cross section may have a keyway.

A lever, 9, is pivoted on the second caliper by a pin or other bearing 10, serving as a fulcrum and bears on the slider-mounted brake block 2 at a cam drive engagement surface, 11. The lever 9, incorporates a retainer or fastener, 12, for the actuating cable, 13. The outer housing, 14, of the actuating cable, 13 is retained in a conventional screw adjuster, 15, mounted on the main caliper. The operating cable is connected to a conventional hand lever (not shown) as used on most lightweight bicycles. A spring, 16, tends to push the second caliper outward on member 8 when the actuating cable is released.

In operation, squeezing of the hand lever causes retraction of the actuating cable in the normal manner for bicycle hand brakes. The proportionns of the mechanism (to be more fully described below) are such that the second caliper 7 slides along the straight member 8 until a predetermined force has been applied, which will normally occur through the action and reaction of the brake blocks 1 and 2 bearing against the wheel rim 3. When a force on the cam drive surface 11 has built up sufficient force to overcome the preload on the spring, 17, together with frictional forces, in the slider-mounted brake block 2, it can be designed that the second caliper 7 will lock on the straight member 8. Further movement of the actuating cable moves the lever 9 around the fulcrum pin 10, and brings a high mechanical advantage to movement of the brake block 2.

Figure 2:
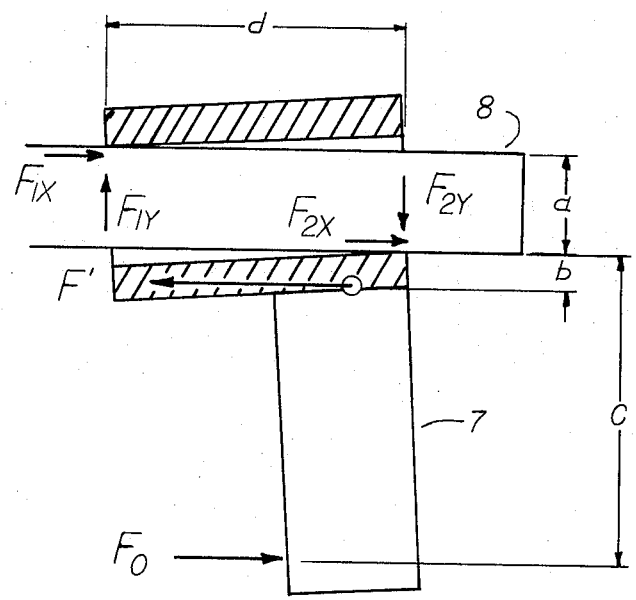
FIG. 2 shows a detail of FIG. 1.

The proportions to which the mechanism must be designed are now described with reference to FIG. 2, which shows diagrammatically the second caliper 7 on the straight member 8 of the main caliper, at the point of sliding. The force applied by the actuating cable is $F'$; the brake-block reaction is $Fo$, and the normal and frictional forces acting at the ends of the slider are $F1x$, $F1y$, $F2x$ and $F2y$. The signifacant dimensions $a$, $b$, $c$, and $d$ are shown in FIG. 2.

Consideration of the balance of forces and moments results in the following.

$F1y = Fy$   $F1y = 2y = Fy$.
$F1x = \mu F1y = \mu F2y = F2x = Fx$
$(F2x = \mu F2y)$ where $\mu$ is the coefficient of friction
$F' - 2Fx = Fo$
$Fy\, d + F'\, b + Fx\, a = Fo\, c$ These can be rearranged to show the relationship between $Fo$ and $F'$:

$((Fo/F') = ((d/a\mu) + 2b/a + 1)/((d/a\mu) + 2c/a + 1))$

This relationship enables the actuating force $F'$ at which the brake-force reaction reaches a certain value $Fo$, to be set. The spring preload in the spring-returned slider 6 carrying brake-block 2 should be adjusted to this force $F'$.

For the second caliper to lock under the brake-force reaction $Fo$, the following relation must be satisfied.

$2\mu(a/2b + c/d) > 1$

In the prototype, $\mu$ for aluminum on aluminum is about 1.05, and $a/d = 0.63$ and $c/d - 1.58$. $b$ was approximately zero.

Hydraulic mechanism

Figure 3:
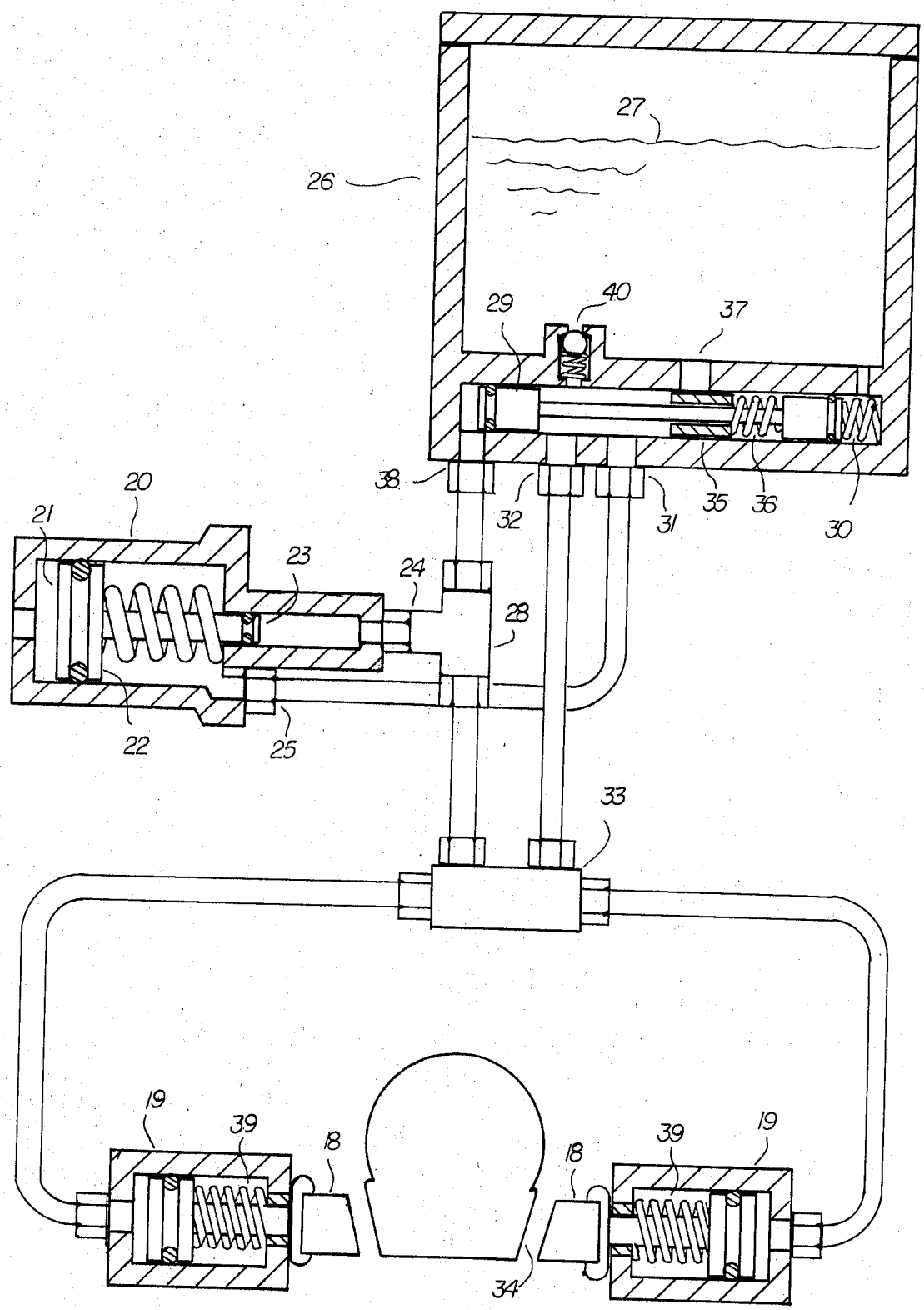
FIG. 3 illustrates a hydraulic system.

The hydraulic embodiment of this invention will now be described with reference to FIG. 3.

The brake blocks, 18, are fixed to the pistons of identical brake cylinders, 19, of conventional design. The master cylinder, 20, which is actuated by a hand lever (not shown) contains a stepped piston, 21, having a larger diameter, 22, and a smaller diameter, 23. The outlet, 24, from the smaller-diameter cylinder and the outlet, 25, from the larger-diameter cylinder are connected to a pressure-sensing bypass valve, 26 in which is incorporated (in the present embodiment) a hydraulic-fluid reservoir, 27. The smaller-diameter cylinder is connected directly through a tee-connection, 28, with the brake cylinders and also with the high-pressure face of a spool, 29. The spool and the ports machined in the surrounding cylinder constitute the spool valve.

The spool, 29, is urged to the left by a spring, 30. In the leftward position, fluid leaving the larger-diameter cylinder through the port, 25, enters the chamber, 31, and leaves through port, 32. This fluid then combines with the fluid from the smaller cylinder in the manifold, 33, the total of which fluid passes on to the brake cylinders.

When the brake shoes contact the rim of the wheel, 34, the continued force on the hand lever causes the pressure in the fluid lines to increase. This pressure is sufficient to overcome the initial loading in the spring, 30, causing the spool, 29, to move to the right. Almost immediately the spool valve closes the port, 32, from which fluid from the larger-diameter cylinder could pass to the brake cylinders. Thus only fluid from the smaller-diameter cylinder is used to provide the braking action, resulting in a high force mechanical advantage.

Meanwhile, pressure in the chamber, 31, increases until the auxiliary spool, 35, compresses the soft spring, 36, and allows the fluid to escape through the port, 37, into the reservoir, 27. Thus the pressure in the chamber is always below the pressure on the spool valve at the inlet port, 38.

Release of the hand lever reduces the high pressure at the left-hand port, 38, and the compressed spring, 30, returns the spool, 29, to its original position. Return springs, 39, in the brake cylinders assure rapid release of the brake blocks from the wheel rim, while forcing fluid back into the master cylinder. Suction caused by the spring-induced return action of the master piston draws the remaining fluid necessary from the reservoir through the one-way ball valve, 40, the chamber, 31, and/or manifold, 33, back to the master cylinder.

What we claim is:

1. A braking mechanisms for bicycle wheels and the like, comprising a pair of caliper elements each carrying a respective brake block;

one such caliper element being carried by the other caliper element and having relative movement thereon; and means predetermining an initial braking force whereby said one caliper element has said relative movement to a limiting position responsive to said brake blocks having initial wheel engagement for braking thereof with said initial predetermined braking force;

manually operable means for effecting relative movement of said caliper elements to effect said initial wheel engagement;

a lever carried by said one caliper element and securing means providing relative movement with respect thereto;

said manually operable means being attached to said lever to effect said initial relative movement of said caliper elements and respective brake blocks to effect wheel engagement;

said means predetermining an initial braking force comprising a movable mount means for the respective brake block of said one caliper element for subsequent movement of said brake block after said initial engagement to effect increased braking pressure upon continued operation of said manually operable means;

and drive means whereby said lever effects movement of said latter brake block to effect said increased braking pressure.

2. A braking mechanism as set forth in claim 1, said other caliper element having a member on which said one caliper element is slidable and tiltable, and a spring intermediate said caliper elements and carried on said member for initially spacing the respective brake blocks away from a wheel; wherein initial braking force applied to said caliper elements effects tilting of said one caliper element on said member to achieve a locked condition thereon responsive to said initial wheel engagement.

3. A braking mechanism as set forth in claim 1, wherein said one caliper element is slidable on said other caliper element and said securing means permits rocking of lever; said movable mount means of said respective brake block comprising bias means having a preloaded stress which determines the initial braking force and being overcome by rocking of said lever subsequent to said initial engagement of said brake blocks to effect said increased braking pressure.

* * * * *